P. L. BOVIER.
APPARATUS FOR THE CHANGE OF VIEWS, DESIGNS, OR CHARACTERS.
APPLICATION FILED FEB. 26, 1921.

1,432,662.

Patented Oct. 17, 1922.

INVENTOR
PHILIBERT LEON BOVIER
BY
ATTORNEYS

P. L. BOVIER.
APPARATUS FOR THE CHANGE OF VIEWS, DESIGNS, OR CHARACTERS.
APPLICATION FILED FEB. 26, 1921.

1,432,662.

Patented Oct. 17, 1922.

INVENTOR
PHILIBERT LÉON BOVIER
BY
ATTORNEYS

Patented Oct. 17, 1922.

1,432,662

UNITED STATES PATENT OFFICE.

PHILIBERT LÉON BOVIER, OF PARIS, FRANCE.

APPARATUS FOR THE CHANGE OF VIEWS, DESIGNS, OR CHARACTERS.

Application filed February 26, 1921. Serial No. 448,206.

*To all whom it may concern:*

Be it known that I, PHILIBERT LÉON BOVIER, a citizen of 24 Rue de l'Yvette, Paris, France, have invented an Apparatus for the Change of Views, Designs, or Characters, of which the following is a full, clear, and exact description.

This invention has for its object an apparatus for the change of views, designs or characters, automatically operating under the action of vibrations, shocks or jolts.

This apparatus, which does not comprise any driving spring or mechanism subject to wear and requiring maintenance, nor any transmission apt to warp or to get out of order, is essentially characterized by the fact that the driving parts are constituted by small, supple and resilient stems, such for instance as brush bristles, vegetal fibres, animal hair, inclined or curved relatively to the surface to be driven carrying any desired images, designs or inscriptions and in contact, through one of their ends, with the said surface; the said flexible and resilient stems are inserted in a suitable support suspended, preferably in a resilient manner, in a box subjected to the action of vibrations, jolts or shocks, for the purpose of transmitting, to the driving, supple and resilient parts, vibrations which successively remove and draw their free end from and towards the surface to be driven along, and determine, near the end of the expansion of these driving parts, a thrusting action on the said surface, which is thus actuated, whatever may be the direction in which the jolts or shocks take place, with a regular movement of the same direction, thereby presenting, through a window or opening the various images, designs or inscriptions carried by the band or strip.

The apparatus constructed in accordance with the above principle is very sensitive owing to the fineness and resiliency of the driving parts or elements; the multiplicity of these elements giving, moreover, the power and the speed by addition of the peculiar effect of each element.

Finally, the arrangement according to the generatrices of a cylinder or in concentric circles allows of utilizing all the shocks, all the jolts or jerks whatever may be the direction of the same and the parallel inclination of the elements permits the transformation of the disorderly movements into a movement of determined direction.

Different effects can be obtained by causing each of these factors to vary; it will also be possible to obtain speeds, directions of rotation, as well as degrees of sensibility which are different, even on one and the same apparatus, by dividing the cylinder in sections and inclining in reverse direction the driving elements on these various sections.

In order that the invention may be clearly understood, two forms of apparatus constructed in accordance with the above principle will be described hereafter, by way of example only, with reference to the accompanying drawing.

These apparatuses, which are more particularly adapted to be used for advertising purposes, can be placed in any vehicles for the transport of travellers and are automatically actuated by the vibrations resulting from the running of the vehicles, so as to present to the travellers changing advertisements.

Figure 1:
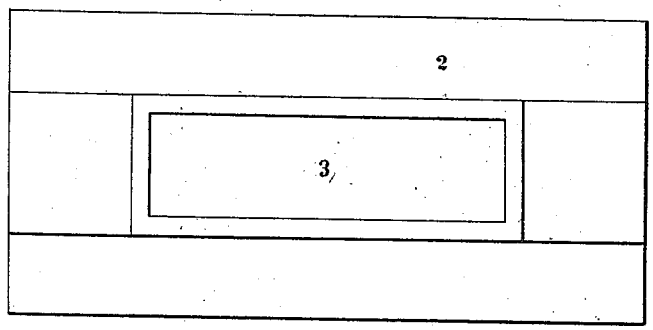
Fig. 1 is a front elevation of the first apparatus.
Figure 3:
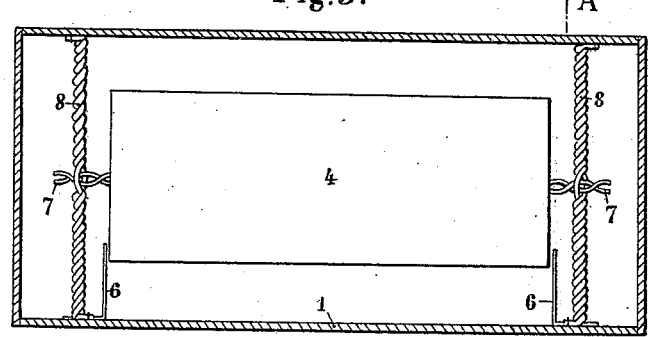
Fig. 3 is a vertical longitudinal section made on line B—B of Fig. 2.
Figure 5:
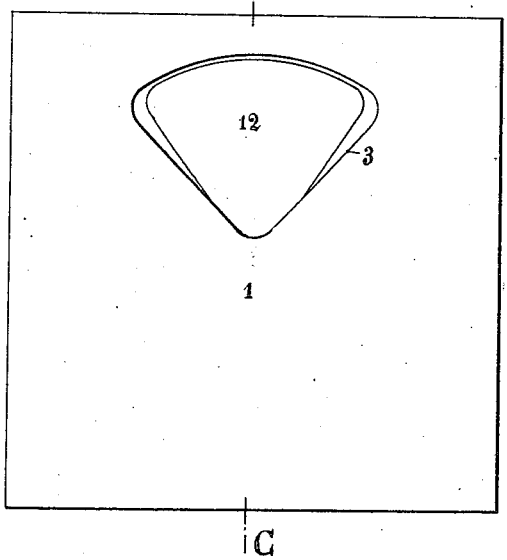
Fig. 5 is a front elevation of a second form of apparatus.
Figure 2:
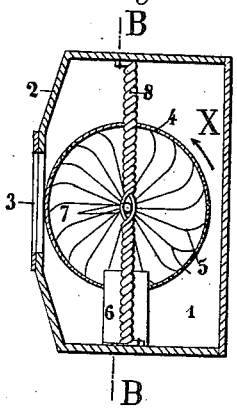
Fig. 2 is a cross vertical section made on line A—A of Fig. 3.
Figure 7:
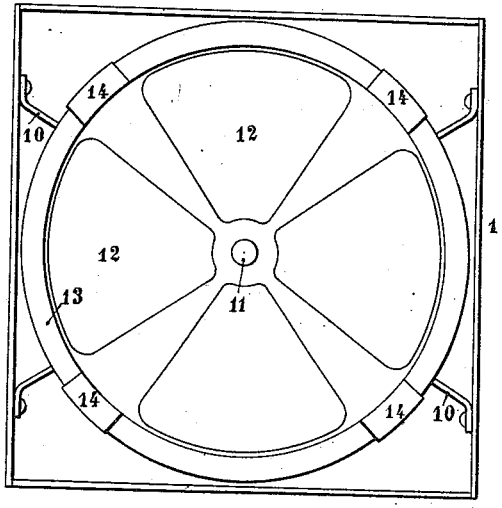
Fig. 7 is an inner view of the apparatus, the cover being removed as indicated by line D—D of Figure 6.
Figures 6, 10:
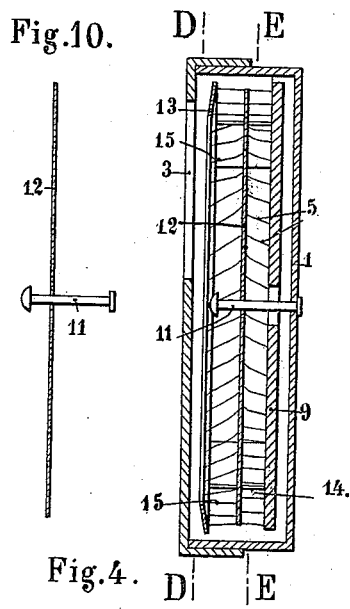
Fig. 6 is a longitudinal vertical section made on line C—C of Fig. 5.
Fig. 10 is a detail.
Figure 8:
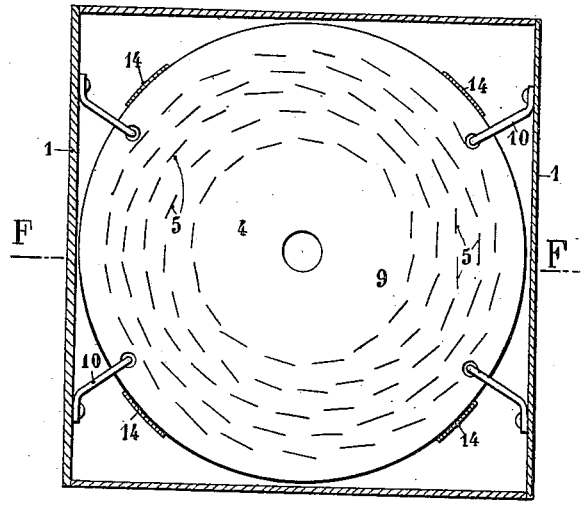
Fig. 8 is a vertical section made on line E—E of Fig. 6, the movable disc being removed.

The apparatus shown in Figs. 1 to 3 comprises a box 1 adapted to be secured at any suitable place of any vehicle, autobus, tramway, railway carriage, etc., and presenting on its front face 2, directed towards the public, fixed advertisements arranged about a window 3 closed by a glass plate and through which is automatically presented the movable advertisement.

This movable advertisement is carried, in the example illustrated, by a cylindrical drum 4, made of paper or other material and the inner surface is preferably roughened or provided with small grooves.

The drum 4 is loosely mounted and with a certain play on a cylindrical brush 5 and is held against any longitudinal displacement on the latter by means of stops or abutments 6 carried by the box 1.

The brush 5 constitutes the driving device of the apparatus; it is formed by bunches of bristles mounted and secured in any suitable manner on a horizontal axis 7 which can be rigidly supported within the box 1, or preferably, resiliently suspended in the latter on rubber cables 8, as shown in Figs. 2 and 3, this arrangement increasing the sensitiveness of the apparatus.

The bunches of bristles constituting the cylindrical brush 5 are all inclined in the same direction relatively to the axis 7 which carries them and the bristles are, moreover, curved at the end which is in contact with the inner face of the drum, as shown in Fig. 2.

By this arrangement if a jolt moves the cylinder A in a horizontal direction, this cylinder which is mounted with a certain play on the supple moving elements 5, first comes in contact with a certain number of these elements and going further bends and flattens these elements more and more in the direction in which they were already extending.

As these moving elements have a certain rigidity, their free ends, which alone are movable, are, in the example shown in Figure 2, carried toward the case to a certain extent and actuate in this movement the cylinder 4 which thus effects a certain angular rotation in the direction indicated by arrow X. The elements 5 being placed corresponding to the entire internal surface of the cylinder 4 and all having the same inclination it will be understood that any jolts or shocks which may occur, whatever their direction, will produce the same effect, that is, cause rotation of cylinder 4 in the direction indicated by arrow 6.

The supple and resilient driving elements act therefore as elementary elements, the movable cylinder 4 first receiving the initial movement and transmitting it to the driving element which transforms it by giving to the same a suitable direction which in the example of Fig. 2 is indicated by the arrow X.

Figure 4:
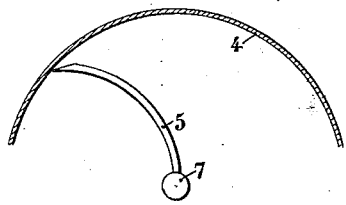
Fig. 4 is a detail.
Figure 9:
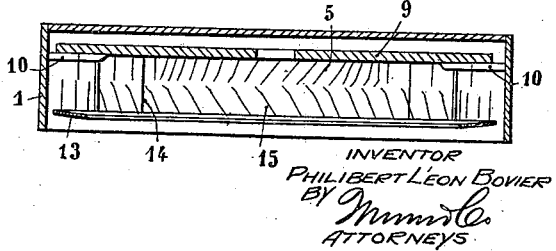
Fig. 9 is a horizontal section made on line F—F of Fig. 8.

For increasing the sensitiveness of the apparatus, the end of each bristle or hair is, as shown in Fig. 4, cut in a bevel, this can be obtained by milling this end by glass paper, for instance.

In the second form of execution, the driving elements are constituted by hair or bristles 5 which are inserted in circular concentric rows in a disc 9, made of wood, cardboard, metal or other suitable material, rigidly secured in a flat box 1 or resiliently suspended in the latter by means of rubber cables 10.

The bristles 5 are inclined on their supporting disc 9 and their free end is curved as indicated above.

A horizontal shaft 11 passes freely through the disc 9 at the center of the latter; this shaft 11 is secured on the bottom of the box 1 and on the said shaft is loosely mounted a second disc 12 on the front face of which are printed the views, advertisements, etc., to be successively brought opposite the glass covered opening 3 provided on the front face of the box 1.

The movable disc 12 is made of paper, thin cardboard, celluloid, colophony, etc., and is held in contact with the series of bristles 5 carried by the fixed disc 9 by means of a ring 13 arranged in front of the movable disc.

This ring is fixed and is connected by lugs 14 to the fixed disc 9; it is moreover provided, on the face directed towards the movable disc 9, with hair or bristles 15 which are so inclined they do not interfere with the rotation of the movable disc 12 and maintain it in contact, when strong jerks or jolts take place, with the bristles 5 carried by the fixed disc 9.

This apparatus operates in the same manner as that previously described, that is to say that, under the influence of the vibrations of the bristles 5, the latter form driving pawls for the movable disc 12, which rotates on the horizontal axis 11, by successively presenting in front of the opening or window 3 the various advertisements it carries.

The apparatus has, however, the advantage, over that described with reference to Figs. 1 to 3, of presenting only an extremely reduced size in thickness, thus rendering the use of the said apparatus more easy in motorbus and railway carriages.

Moreover, the bristles 15 carried by the ring 13 constitute retaining pawls which prevent the turning backward of the movable disc 12.

The constructional arrangements above described are of course given by way of example only as it is obvious that the forms, materials and dimensions of the various constituent parts may be varied without departing thereby from the principle of the invention.

The above described apparatuses can also be applied, without modifying the scope of the inventiton, to the creation of games or toys in which the jerks or shocks could be imparted to the box containing the driving device either directly by hand or through the medium of suitable members.

Claims—

1. An apparatus for the change of any views, designs or characters, operating automatically under the action of shocks or vibrations and comprising: a box subjected to the action of shocks or vibrations; a glass covered opening or window in the said box; a driving member resiliently suspended in the box and provided with flexible and resilient driving elements; a surface carrying the views, designs, etc., arranged in the box, opposite the said window and in contact with the flexible and resilient driving elements, so as to transmit the shocks or vibrations from the box to the driving elements, to lay flat the latter and to actuate the said surface with a continuous and regular movement of rotation.

2. An apparatus for the change of any views, designs or characters, operating automatically under the action of shocks or vibrations and comprising: a box subjected to the action of shocks or vibrations; a glass covered opening or window in the said box; flexible and resilient stems inserted according to a certain inclination on a central axis resiliently suspended in the box, so as to form a driving cylindrical brush; a cylindrical surface carrying views, designs, etc., arranged in the box, opposite the said window and in contact with the flexible and resilient driving elements, so as to transmit the shocks or vibrations from the box to the driving elements, to lay flat the latter and to actuate the said surface with a continuous and regular movement of rotation.

3. An apparatus for the change of any views, designs, or characters, operating automatically under the action of shocks or vibrations and comprising: a box subjected to the action of shocks or vibrations; a glass covered opening or window in the said box; flexible and resilient stems cut in a bevel at their free end and inserted according to a certain inclination on a central shaft resiliently-in the box so as to constitute a cylindrical driving member,—a cylindrical surface carrying views, designs etc., arranged in the box, opposite the said window and in contact with the flexible and resilient driving elements, so as to transmit the shocks or vibrations from the box to the driving elements, to lay flat the latter and to actuate the said surface with a continuous and regular movement of rotation.

4. A view changing apparatus comprising a casing provided with a sight opening in one side, and adapted to be subjected to shocks or vibrations, a rotatable driving member, flexible and resilient filaments projecting from said member in inclined planes, a view carrying member rotatably mounted in said casing and in contact with said flexible elements whereby shocks or vibrations transmitted from the casing to the flexible elements causes the same to flatten and thereby actuate the view carrying member with a continuous and regular rotary movement.

5. A view changing apparatus comprising a casing provided with a sight opening in one side and adapted to be subjected to shocks or vibrations, a vibratory member resiliently supported in said casing, flexible and resilient filaments projecting from said vibratory member in inclined planes so as to form a driving brush, a view carrying member mounted to rotate in said casing and in contact with said flexible elements, whereby shocks or vibrations transmitted from the casing to the flexible elements cause the same to flatten and thereby actuate the view carrying member with a continuous and regular rotary movement.

The foregoing specification of my "apparatus for the change of views, designs or characters, operating under the action, of vibrations shocks or jolts," signed by me this 7th day of February, 1921.

PHILIBERT LÉON BOVIER.